(12) United States Patent
Kim

(10) Patent No.: US 10,994,652 B2
(45) Date of Patent: May 4, 2021

(54) EMERGENCY NOTIFICATION DEVICE FOR VEHICLE AND REAR VEHICLE ASSISTANCE SYSTEM INCLUDING SAME

(71) Applicant: Jae Bok Kim, Jeonju-si (KR)

(72) Inventor: Jae Bok Kim, Jeonju-si (KR)

( * ) Notice: Subject to any disclaimer, the term of this patent is extended or adjusted under 35 U.S.C. 154(b) by 0 days.

(21) Appl. No.: 16/637,161

(22) PCT Filed: Aug. 7, 2018

(86) PCT No.: PCT/KR2018/008974
§ 371 (c)(1),
(2) Date: Feb. 6, 2020

(87) PCT Pub. No.: WO2019/031821
PCT Pub. Date: Feb. 14, 2019

(65) Prior Publication Data
US 2020/0369203 A1 Nov. 26, 2020

(30) Foreign Application Priority Data

Aug. 7, 2017 (KR) .................. 10-2017-0099489
Aug. 7, 2017 (KR) .................. 10-2017-0099764
(Continued)

(51) Int. Cl.
*B60Q 1/52* (2006.01)
*B60Q 1/26* (2006.01)

(52) U.S. Cl.
CPC ............. *B60Q 1/52* (2013.01); *B60Q 1/2692* (2013.01); *B60Q 1/2696* (2013.01)

(58) Field of Classification Search
CPC ...... B60Q 1/2696; B60Q 1/52; B60Q 1/2692; E01F 9/662; E04H 15/48; F21Y 2115/10
See application file for complete search history.

(56) References Cited

U.S. PATENT DOCUMENTS

2011/0317233 A1* 12/2011 Hayashibe ........... G02B 26/101
359/201.2
2012/0188792 A1* 7/2012 Matsumoto .......... G02B 6/0036
362/613
(Continued)

FOREIGN PATENT DOCUMENTS

JP       2016-107749 A     6/2016
KR    10-2011-0014968 A    2/2011
(Continued)

*Primary Examiner* — Mirza F Alam
(74) *Attorney, Agent, or Firm* — Novick, Kim & Lee, PLLC; Jae Youn Kim

(57) ABSTRACT

The present invention provides an emergency notification device for a vehicle that includes: a base; a support pole composed of a plurality of pole rods sequentially connected to the base; and a light emitting frame unit connected to the pole rods to be unfolded or folded in accordance with moving up or down of the pole rods, in which the plurality of pole rods gradually changes in diameter in an antenna type to be sequentially accommodated in a pole rod having the largest diameter or unfolded from the pole rod having the largest diameter, and the plurality of pole rods are coupled with an elastic member therebetween when accommodated, and raised by elasticity of the elastic members when the elastic members are not locked.

12 Claims, 13 Drawing Sheets

(30) Foreign Application Priority Data

Sep. 18, 2017 (KR) .......................... 10-2017-0119242
Dec. 18, 2017 (KR) .......................... 10-2017-0174663
Aug. 6, 2018 (KR) .......................... 10-2018-0091465
Aug. 7, 2018 (KR) .......................... 10-2018-0091863

(56) References Cited

U.S. PATENT DOCUMENTS

2013/0128611 A1\* 5/2013 Akutsu ................ G03H 1/0248
362/607
2015/0369990 A1\* 12/2015 Wang ................... G02B 6/0058
362/607

FOREIGN PATENT DOCUMENTS

| KR | 10-2012-0090193 A | 8/2012 |
| KR | 10-2013-0093280 A | 8/2013 |
| KR | 10-1544646 B1 | 8/2015 |

\* cited by examiner

EMERGENCY NOTIFICATION DEVICE FOR VEHICLE AND REAR VEHICLE ASSISTANCE SYSTEM INCLUDING SAME

TECHNICAL FIELD

The present invention relates to an emergency notification device for a vehicle and a rear vehicle assistance system including the same.

BACKGROUND ART

A notification method is to set a triangle reflector when a vehicle is broken, or an accident occurs son a road. Recently, rear collision accidents with vehicles stopped on the shoulders of expressways, motorways, or state roads have been frequently occurred.

In particular, these accidents more frequently occur on expressways and motorways that are paved well for high-speed driving. When situations such as breakdown of a vehicle and puncture on a tire occur during driving, drivers pull over the vehicle and wait for a wrecker or replace the punctured tire, and in this case, it is required to set a triangle reflector that notifies an emergency situation. However, when it is difficult to recognize the triangle reflector due to heavy traffic and when it is nighttime or a visual field is unclear, the following vehicles fail to recognize the triangle reflector, so rear collision accidents frequently occur. Further, it is impossible to move the vehicle to the shoulders in most breakdown or sudden accidents and turning on the emergency light is the only way of making the following vehicles recognize the situations, so secondary rear collision accidents follow.

Further, there is no effective notification device that makes surrounding vehicles drive safely and carefully when a yellow bus or a disabled vehicle is stopped and passengers board or alight, so there is always a possibility of a safety accident. Further, following vehicles frequently fail to recognize situations and cause a rear collision accident while an accident is coped with or a road is being constructed.

In order to solve these problems, there is an intense demand for an effective and practical emergency notification device for a vehicle that is systemized in a built-in form in a vehicle, is attached to a vehicle as an independent device, or is manufactured as a mobile device and protects human life and makes traffic flow smoothly by making following drivers quickly recognize a sudden situation.

DISCLOSURE

Technical Problem

In order to solve the problems described above, and an objective of the present invention is to provide an emergency notification device for a vehicle that can quickly inform following drivers of a sudden situation by operating through one touch even though a problem is generated with an electrical wire in a car accident.

Further, the present invention provides an emergency notification device that is integrally mounted inside in combination with a vehicle system, that springs up like an airbag to be automatically unfolded, for example, in a triangular shape or predetermined various different shapes and generate a light emitting signal to warn following vehicles at a differentiated height that following vehicles can easily see, when the vehicle is suddenly braked due to a sudden situation, or when a shock of predetermined intensity or more is sensed, or when the vehicle is suddenly braked by an anti-collision system, that has excellent visibility and quickly operates.

Technical Solution

The present invention provides an emergency notification device for a vehicle that includes:

a base;

a support pole composed of a plurality of pole rods sequentially connected to the base;

and a light emitting frame unit connected to the pole rods to be unfolded or folded in accordance with moving up or down of the pole rods, in which the plurality of pole rods gradually changes in diameter in an antenna type to be sequentially accommodated in a pole rod having the largest diameter or unfolded from the pole rod having the largest diameter, and the plurality of pole rods is coupled with an elastic member therebetween when accommodated, and raised by elasticity of the elastic members when the elastic members are not locked, and the light emitting frame unit includes first and second light emitting frames each having an end rotatably connected to the upper end of a pole rod positioned at the uppermost end when unfolded of the plurality of pole rods, and third and fourth light emitting frames each having an end rotatably connected to the other ends of the each of the first and second light emitting frames, in which the third and fourth light emitting frames are formed to be shorter than the first and second frames, the third and fourth light emitting frames have the other ends rotatably connected to the upper end of a pole rod connected next to the pole rod positioned at the uppermost end, so when the pole rod positioned at the uppermost end is raised and the first and second light emitting frames are pulled, the ends of the third and fourth light emitting frames are pulled and unfolded.

When the pole rod positioned at the uppermost end is raised, the ends of the third and fourth light emitting frames are pulled, the other ends are rotatably coupled to the pole rod connected next to the pole rod positioned at the uppermost end and perpendicularly connected to the pole rod, and the third and fourth light emitting frames form a triangle together with the first and second light emitting frames.

The support poles include a pipe-shaped first pole rod 110, a second pole rod 120, and a third pole rod 130. The first pole rod 110 has an end fixed to a lower end of the base 200, the second pole rod 120 has an end connected to the other end of the first pole rod 110 and is formed to be able to insert the first pole rod 110 therein because the diameter of the second pole rod is larger than that of the first pole rod 110, and the third pole rod 130 has an end connected to the other end of the second pole rod 120 and is formed such that the second pole rod 120 can be inserted therein.

The light emitting frame unit includes a first light emitting frame 150 and a second light emitting frame 160 of which ends are rotatably coupled to the upper end of the third pole rod 130, a third light emitting frame 170 of which an end is rotatably coupled to the other end of the first light emitting frame 150 and the other end is rotatably coupled to the lower portion of the third pole rod 130, and a fourth light emitting frame 180 of which an end is rotatably coupled to the other end of the second light emitting frame 160 and the other end is rotatably coupled to the lower portion of the third pole rod 130.

A cut portion 131 is formed with a predetermined length in the longitudinal direction through the center of the third pole rod 130, the other ends of the third light emitting frame 170 and the fourth light emitting frame 180 are coupled to face each other by a pin with the cut portion 131 of the third pole rod 130 therebetween, and the pin moves along the cut portion 131 of the third pole rod 130.

A warning light is disposed in the upper end of the third pole rod.

The base further includes a base main body to which the first pole rod is coupled, and an L-shaped side angle adjuster rotatably coupled to a side of the upper end of the base main body.

In order to achieve the objects, a rear vehicle assistance system according to an embodiment of the present invention includes:

a base;

a plurality of pole rods sequentially connected to the base; and a light emitting frame unit connected to the pole rods to be unfolded or folded in accordance with moving up or down of the pole rods, in which the plurality of pole rods gradually changes in diameter in an antenna type to be sequentially accommodated in a pole rod having the largest diameter or unfolded outward from the pole rod having the largest diameter, and the plurality of pole rods is coupled with an elastic member therebetween when accommodated, and raised by elasticity of the elastic members when the elastic members are not locked, and the light emitting frame unit includes a first holder fixed to the upper end of a pole rod positioned at the uppermost end when unfolded of the plurality of pole rods, first and second light emitting frames each having an end rotatably connected to the first holder, and third and fourth light emitting frames each having an end rotatably connected to the other end of the each of the first and second light emitting frames, in which the third and fourth light emitting frames are formed to be shorter than the first and second frames, the third and fourth light emitting frames have the other ends rotatably connected to the upper end of a pole rod connected next to the pole rod positioned at the uppermost end, so when the pole rod positioned at the uppermost end is raised and the first and second light emitting frames are pulled, the ends of the third and fourth light emitting frames are pulled and unfolded, the pole rods are locked by raising control protrusions such that raising is suppressed by the elastic member, an operation button for operating an operation of the raising control protrusion is disposed in the base, and the rear vehicle assistance system includes:

an operation button driving unit controlling on/off of the operation button;

a wire connected to a bottom surface of the first holder and wound on a winding roll disposed on the base through an inner space of the pole rods to move down the first holder, and a winding roll driving unit operating to wind or unwind the wire; and a controller operating the operation button driving unit and the winding roll driving unit such that the pole rods are raised and the light emitting frame unit is unfolded in the shape of a triangle reflector when a vehicle that is being driven is suddenly braked, a shock applied to the vehicle with predetermined intensity or more is sensed, a vehicle anti-collision system is operated, or a driving switch is manually pressed.

The rear vehicle assistance system according to an embodiment of the present invention further includes:

an anti-collision system information detection unit acquiring a collision alarm and warning light output data from the vehicle anti-collision system;

a vehicle speed detection unit measuring a vehicle driving speed on the basis of the number of revolutions of an output shaft of a transmission;

a shock sensing unit sensing a shock from the shock sensor; and an operation switch unit outputting an operation control signal of the notification device, in which the controller is connected with the anti-collision system information detection unit, vehicle speed detection unit, the shock sensing unit, and the operation switch unit, and determines whether or not of sudden braking, shock sensing, a sudden situation, and manual control in accordance with an input signal.

The notification device is converted into an operation standby mode by the controller when the vehicle is driven at a predetermined speed and predetermined time or more in the operation mode of the notification device.

The emergency notification device for a vehicle is folded and accommodated in an accommodation unit disposed in the vehicle.

Advantageous Effects

By providing the emergency notification device for a vehicle according to the present invention having the configuration described above, there is the advantage in that it is possible to secure desired effects by operation the emergency notification device having a simple operation structure and quickly operating and it is economical and practical and it is also possible to safely protect a driver from a danger of an accident as compared with a break indicator or a notification device of the related art.

Further, the emergency notification device according to the present invention is systemized and integrally disposed in a vehicle or fixed and attached to the outside as an independent device to be programmed to automatically operate, for example, when a warning light is turned on, a vehicle is suddenly braked, or a shock of predetermined intensity or more is sensed, whereby it is possible to prevent an accident in advance and a secondary collision accident.

Further, the emergency notification device according to the present invention is made as a mobile device having a fixed base to which a magnet of various materials such as plastic by decreasing the weight and volume to be able to be always provided at a side of a driver seat, so that there is the advantage in that when a situation occurs, it is possible to immediately operate and attach the emergency notification device according to the present invention and to safely and quickly shun to a safe area.

Further, there is the advantage in that the emergency notification device according to the present invention can be used for various purposes and various uses by making a notification content of various phrases such fault signs, coping with an accident, information of construction, information of an event, traffic signs such as drinking crackdown, and a temporary parking lot.

BEST MODE

Figure 1:
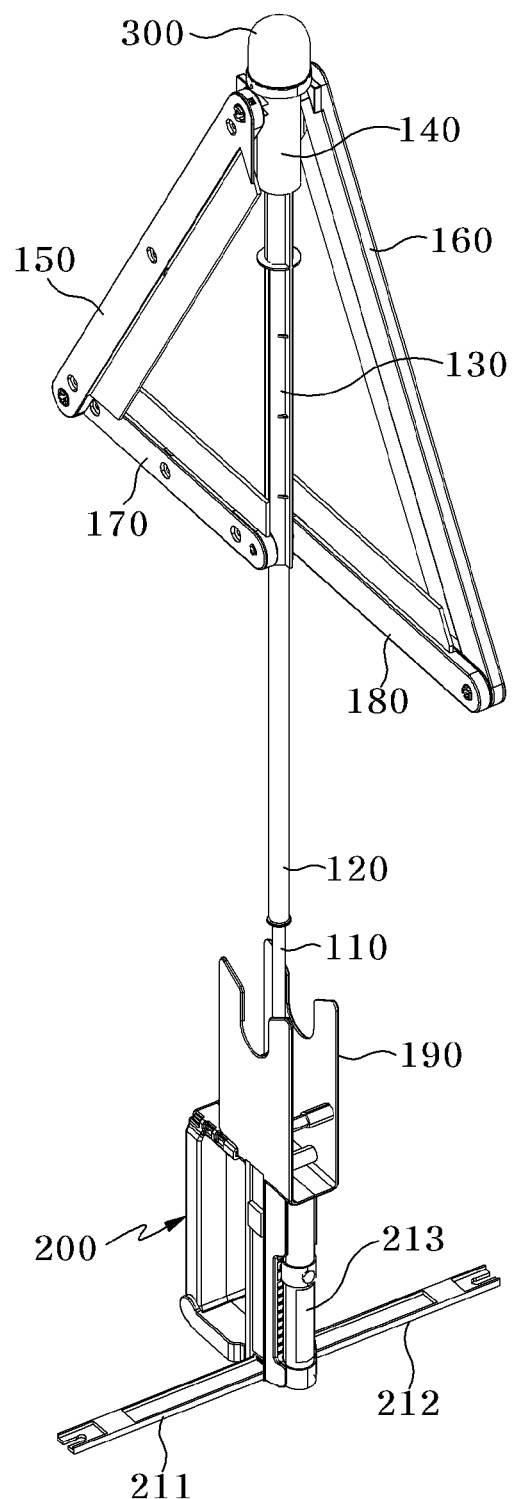
FIG. 1 is a perspective view showing a state in which an emergency notification device for a vehicle according to an embodiment of the present invention finishes being unfolded.

The present invention may have various embodiments by various modifications, so specific embodiments will be shown and described as examples in the drawings. Further, the present invention is not limited to these specific embodiments and should be construed as including all medications, equivalents, and replacements included in the spirit of the present invention.

Hereafter, embodiments of the present invention will be described in detail with reference to the accompanying drawings, the same and corresponding components are given the same reference numbers regardless of the figure numbers, and repeated description for them is omitted.

Figure 2:
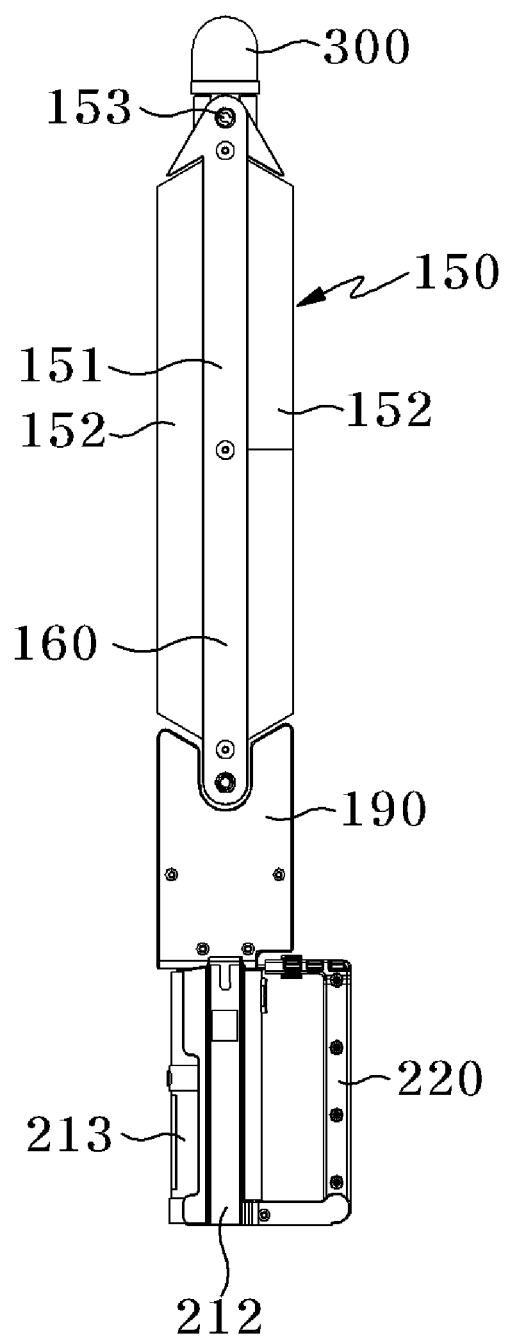
FIG. 2 is a front view showing a state in which the emergency notification device for a vehicle according to an embodiment of the present invention is folded.
Figure 3:
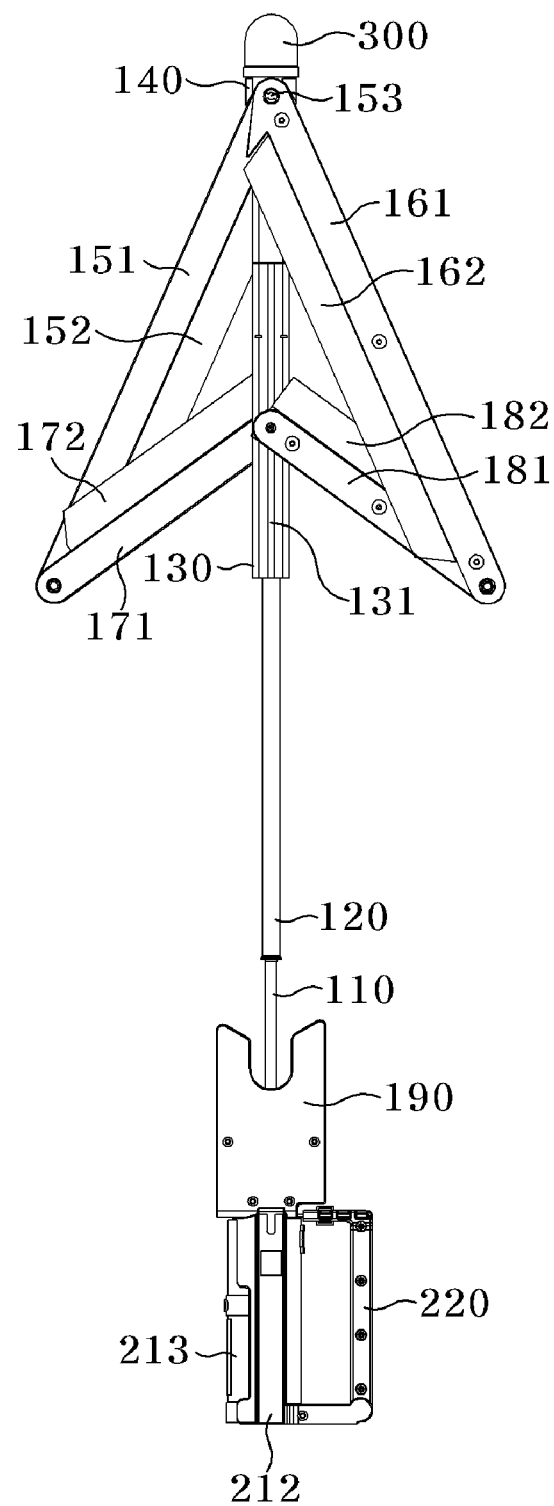
FIG. 3 is a front view showing a state in which the emergency notification device for a vehicle according to an embodiment of the present invention is being unfolded.

FIG. 1 is a perspective view showing a state in which an emergency notification device for a vehicle according to an embodiment of the present invention is unfolded, FIG. 2 is a front view showing a folded state, and FIG. 3 is a front view showing a state of being unfolded. As shown in the figure, an emergency notification device for a vehicle includes a base 200 on which an operation button 230 that unfolds the emergency notification device for a vehicle is mounted, support poles 110, 120, and 130 composed of a plurality of pole rods sequentially connected to the base 200, and light emitting frame units 150, 160, 170, and 180 connected to the upper ends of the support poles to be folded.

The base 200 is coupled to the lower ends of the support poles, and various light emitting devices of the emergency notification device for a vehicle and driving units for automatically unfolding and receiving the support poles may be housed therein. The base 200 has a battery mounting structure that can accommodate a battery or a charging battery for supplying driving power. Further, the base 200 has a magnetic attachment unit on the bottom surface and the sides, so the emergency notification device for a vehicle can be attached to the top surface or the sides of a vehicle. The magnetic attachment unit increases an area that is bonded to a bottom by unfolding when it is attached to the top surface of a vehicle, as indicated by 211 and 212 in FIG. 1, thereby being able to support the light emitting frames that are unfolded high in the shape of a triangle reflector. That is, the magnetic attachment units 211 and 212 can be folded and accommodated in the sides of the base 200 to be easily carried when folded, as indicated by 212 in FIG. 2.

The support poles include a pipe-shaped first pole rod 110, second pole rod 120, and third pole rod 130. The first pole rod 110 has a lower end fixed to the base 200, the second pole rod 120 has an end connected to the upper end of the first pole rod 110 and is formed to be able to insert the first pole rod 110 therein because the diameter of the second pole rod is larger than that of the first pole rod 110, and the third pole rod 130 has an end connected to the other end of the second pole rod 120 and is formed such that the second pole rod 120 can be inserted therein. A cut portion 131 is formed with a predetermined length in the longitudinal direction through the center of the third pole rod 130. The cut portion 131 is set to have a corresponding length to overlap a first light emitting frame 150 and a second light emitting frame 160 when a third light emitting frame 170 and a fourth light emitting frame 180 to be described below are folded.

The light emitting frame unit is composed of the first light emitting frame 150 and the second light emitting frame 160 of which ends are rotatably coupled to a first holder 140 to be described below at the upper end of the third pole rod 130, the third light emitting frame 170 of which an end is rotatably coupled to the other end of the first light emitting frame 150 and the other end is rotatably coupled to the upper end of the second pole rod 120, and the fourth light emitting frame 180 of which an end is rotatably coupled to the other end of the second light emitting frame 160 and the other end is rotatably coupled to the upper end of the second pole rod 120. The first to fourth light emitting frames 150, 160, 170, and 180 include band-shaped panels 151, 161, 171, and 181 having a predetermined width and reflecting members 152, 162, 172, and 182 configured to extend in a wind shape from the sides of the panels 151, 161, 171, and 181. A light emitting member such as an LED or a fluorescent material can be disposed on both sides, thereby being able to notify an accident to the rear on a road.

A holder frame 190 is disposed at the upper end of the base 200 with the first pole rod 110 therebetween, thereby serving to accommodate the support poles in a folded state.

A light emitting lamp 300 is added to the upper end of the third pole rod 130 and a separate light emitting lamp 213 may be additionally included in the base 200. A warning light may be applied as the light emitting lamp 300.

FIG. 2 is a front view showing a state in which the emergency notification device for a vehicle according to an embodiment of the present invention is folded. When the emergency notification device for a vehicle according to an embodiment of the present invention is accommodated, the third and fourth light emitting frames 170 and 180 are overlapped and stowed between the first and second light emitting frames 150 and 160. The third pole rod 130, the second pole rod 120, and the first pole rod 110 that have sequentially decreasing diameters are overlapped and inserted, whereby they are folded in a small size. A second elastic member (not shown) such as a spring is interposed for inserting the second pole rod 120 into the third pole rod 130 and a first elastic member is interposed for inserting the first pole rod 110 into the second pole rod 120. The second pole rod 120 is raised from the first pole rod 110 by the first elastic member and the third pole rod 130 is raised from the second pole rod 120 by the second elastic member. Raising of the second pole rod 120 is controlled by a first raising control protrusion and raising of the third pole rod 130 is controlled by a second raising control protrusion. The first raising control protrusion and the second raising control protrusion are unlocked by the operation button 230, whereby the second pole rod 120 and the third pole rod 130 are raised by elasticity of the first elastic member and the second elastic member. It is preferable to apply a half-moon-shaped protrusion that is repelled by a spring to the first raising control protrusion and the second raising control protrusion.

The first holder 140 is fixed and coupled to the upper end of the third pole rod 130 and the upper ends of the first light emitting frame 150 and the second light emitting frame 160 are rotatably coupled to the first holder 140. That is, the first holder 140 is formed in a cylindrical shape and the upper ends of the first light emitting frame 150 and the second light emitting frame 160 are rotatably coupled to the first holder 140 by a pin 153. An end of the third light emitting frame 170 is rotatably coupled to the lower end of the first light emitting frame 150 by a pin 163. An end of the fourth light emitting frame 180 is rotatably coupled to the lower end of the second light emitting frame 160 by a pin 183. The other ends of the third light emitting frame 170 and the fourth light emitting frame 180 are coupled to face each other by a pin 173 passing through them with the cut portion 131 of the third pole rod 130 therebetween. The pin 173 moves along the cut portion 131 of the third pole rod 130.

Accordingly, when the support poles are unfolded and the raising control protrusions are unlocked, the third pole rod 130 is raised by elasticity of the elastic member and the pin 173 to which the other ends of the third light emitting frame 170 and the fourth light emitting frame 180 are coupled moves down to the lower portion of the cut portion 131 from the upper portion of the cut portion 131, so the positions of the other ends of the third and fourth light emitting frames 170 and 180 are positioned at the lower portion of the third pole rod 130.

Meanwhile, a wire and a power cable are connected through the insides of the third pole rod 130 and the second pole rod 120, so power can be applied to a warning light 300 disposed at the first holder 140 and/or a light emitting lamp such as an LED disposed the light emitting frame unit.

The emergency notification device for a vehicle configured, as described above, in accordance with an embodiment of the present invention can be automatically folded by a driving motor when a vehicle starts to be driven at a predetermined speed or more or a button is pressed or can be folded into the holder frame 190 when external force is manually applied.

Figure 4:
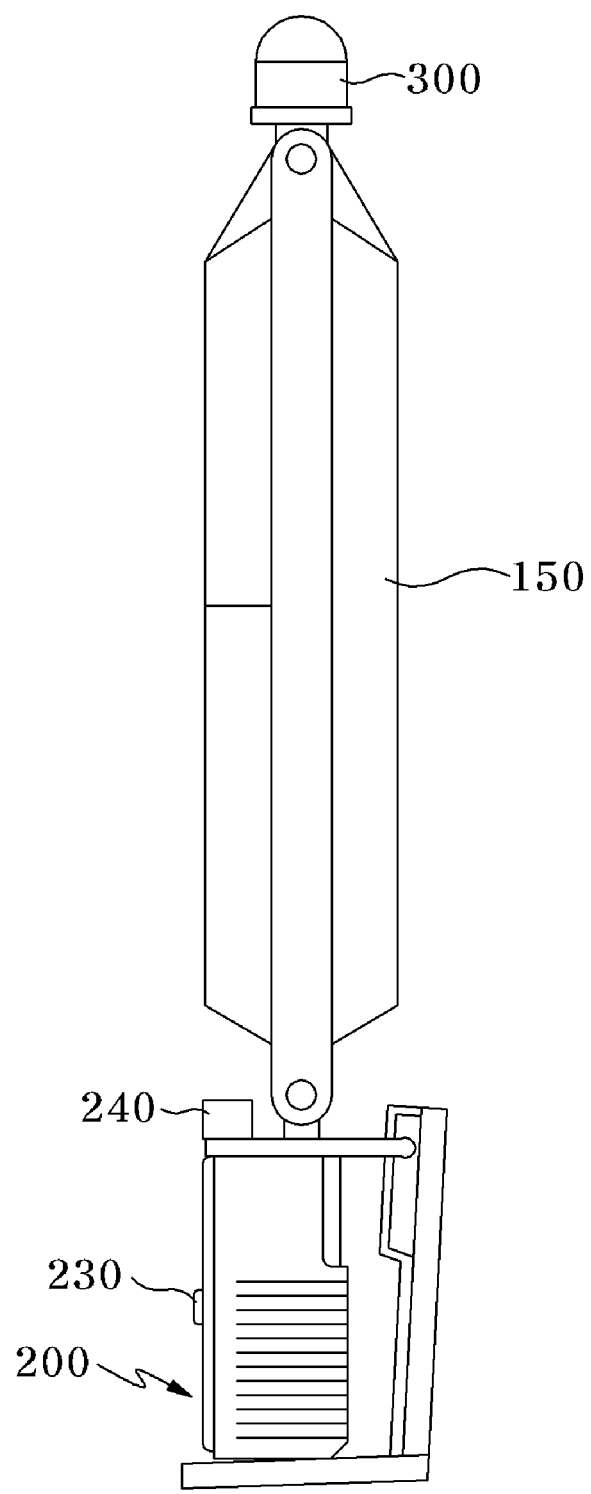
FIG. 4 is a front view showing an emergency notification device for a vehicle according to another embodiment of the present invention.
Figure 5:
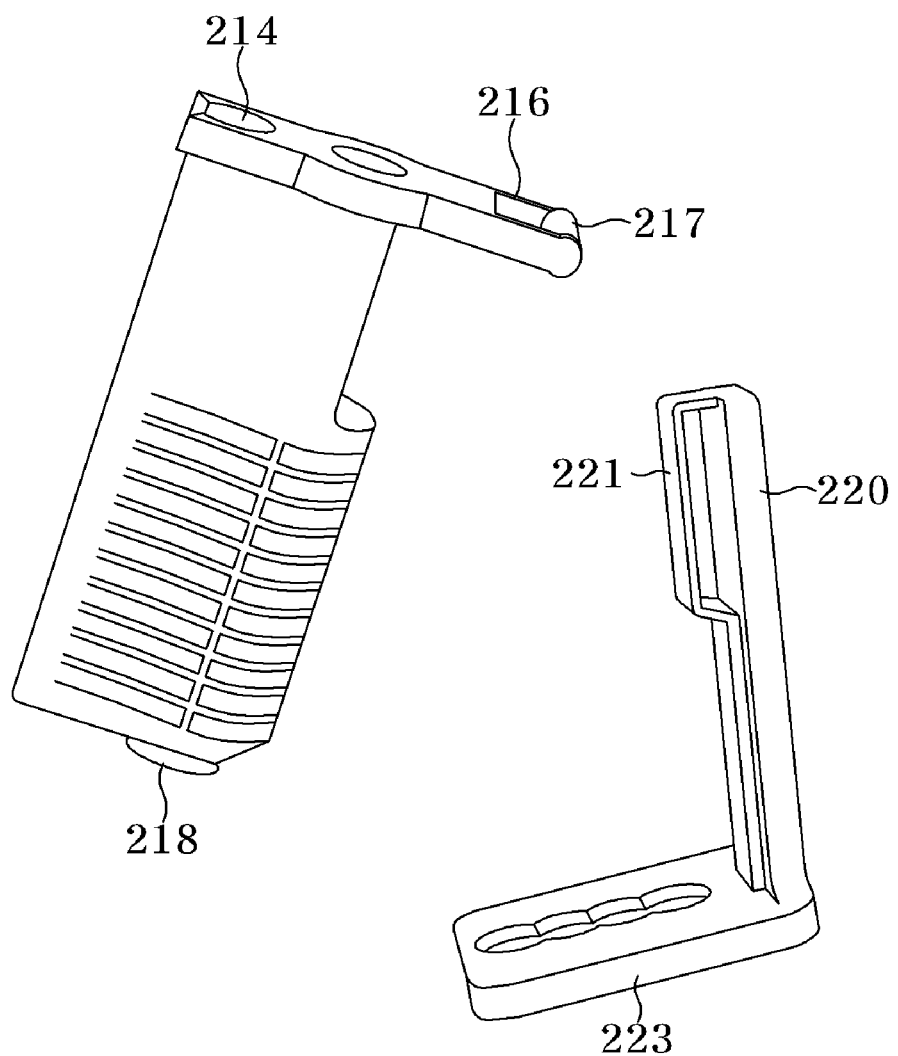
FIG. 5 is a separate perspective view showing the base of FIG. 4.

Meanwhile, FIG. 4 is a front view showing an emergency notification device for a vehicle according to another embodiment of the present invention and FIG. 5 is a separate perspective view showing a base of the emergency notification device for a vehicle according to another embodiment of the present invention. As shown in the figures, it can be implemented without a separate holder frame. The base 200 has a flash accommodation unit 214, and a flash 240 can be made detachable to be separated and used, or the flash is mounted in the flash accommodation unit 214 and can be used as a traffic signal bar. Meanwhile, when the emergency notification device for a vehicle is attached to a side of a vehicle, the side of the vehicle has inclination, so the base 200 has an L-shaped angle adjuster 220 to be horizontal. That is, a connection groove 216 and a bar-shaped connection member 217 for connecting the angle adjuster 220 are formed on the top surface of a base main body, a connection ring 221 is formed at the angle adjuster 220, and the connection member 217 is inserted in the connection ring 221, so the angle adjuster 220 is rotated and the angle of the base 200 can be adjusted. It is preferable that a side plate and a bottom plate 223 of the angle adjuster 220 is made of a strong magnet. Meanwhile, a protrusion 218 is formed on the bottom surface of the main body of the base 200 and a plurality of grooves having a shape corresponding to the protrusion 218 is formed on a surface facing the bottom surface of the main body of the base 200, so when the angle adjuster 220 is rotated at a predetermined angle about the connection member 217 as a rotary shaft, the protrusion 218 is sequentially seated in the plurality of grooves, whereby the protrusion can be fixed while adjusting an angle.

Figure 6:
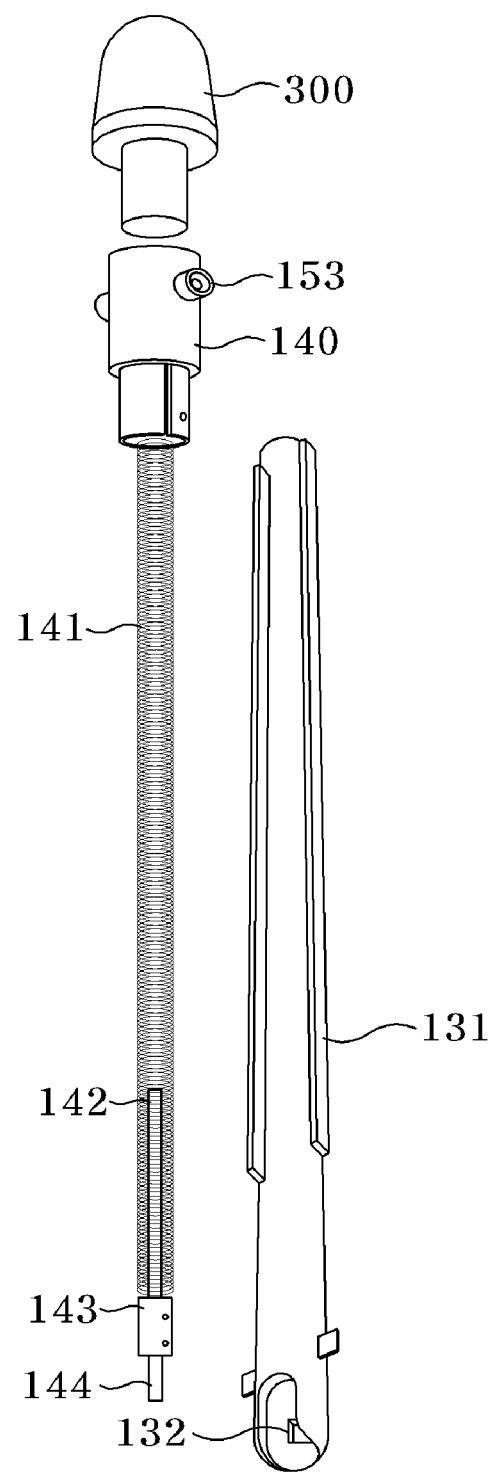
FIG. 6 is an exploded view showing a third pole rod of an emergency notification device for a vehicle according to an embodiment of the present invention.

Meanwhile, FIG. 6 is a separate perspective view showing in detail a coupling structure of the first holder 140 and the third pole rod 130. As shown in the figure, the third pole rod 130 is formed in the longitudinal direction through the outer side such that cut portions 131 face each other, and a spring is mounted in the third pole rod 130 as an elastic member 141. Reference numeral 142 indicates a spring guide bar on which a spring is fitted and reference numeral 143 indicates a second holder to which the other ends of the third light emitting frame 170 and the fourth light emitting frame 180 are connected. The second holder 143 is coupled to the other end of the spring and the upper end of the spring guide bar 142 and is coupled to the upper end of the second pole rod 120. Reference numeral 144 indicates a connection portion for being inserted and coupled in the upper end of the second pole rod 120. Reference numeral 132 indicates a control protrusion groove in which the raising control protrusion is inserted. In the emergency notification device for a vehicle according to the embodiment of FIG. 6, the second holder 143 is disposed inside the third pole rod 130, the other ends of the third and fourth light emitting frames 170 and 180 are rotatably connected by the pin 173 through the cut portion 131, and the second holder 143 is moved up and down inside the third pole rod 130.

On the other hand, the main body of the base 200 is provided with a winding roll and a winding roll driving motor and a wire is connected to the lower end of the first holder 140, so when the wire is pulled by the driving motor and the first holder 140 is automatically moved down, the elastic members 141 of the third pole rod 130 and the second pole rod 120 contract and the light emitting frame unit is folded. Accordingly, the second pole rod 120 is overlapped inside the third pole rod 130 and a lower locking groove 132 of the third pole rod 130 can be fitted and seated to the raising control protrusion of the base 200. Here, for example, a latchet gear that transmits power only in one direction may be installed in the driving motor.

The process in which the emergency notification device for a vehicle according to an embodiment of the present invention is described with reference to FIGS. 1 to 3 and FIG. 6.

First, when the operation button 230 is pressed, the elastic members 141 of the second pole rod 120 and the third pole rod 130 locked by the raising control protrusions repel, the second pole rod 120 and the third pole rod 130 sequentially spring up by elasticity. When the third pole rod 130 moves up, the first light emitting frame 150 and the second light emitting frame 160 coupled to the first holder 140 coupled to the upper end of the third pole rod 130 are moved up together, and the pin connected to the other ends of the third and fourth light emitting frames 170 and 180 moves to the lower portion of the third pole rod 130 along the cut portion 3020. The other ends of the third and fourth light emitting frames 170 and 180 are positioned at the lower end of the cut portion 131 of the third pole rod 130 and ends of the third and fourth light emitting frames 170 and 180 are pulled by raising of the first and second light emitting frames 150 and 160, so the third and fourth light emitting frames 170 and 180 become horizontal and are automatically unfolded in the shape of a triangle reflector together with the first and second light emitting frames 150 and 160 rotatably coupled to the first holder 140.

The device can be used as a common flash without unfolding by operating the light emitting lamps 300 and 240. Further, the flash 240 can be detachably configured and this flash device can be configured to be stowed in the base 200 and to protrude such that up-down and left-right rotation angle can be adjusted to be able to perform the function of lighting in nighttime work such as repair. It is preferable that the flash is made to be turned on upon protruding from an accommodation case.

The operation button 230 that moves up/down the pole rod can be automatically controlled by the vehicle system to automatically perform the function by an operation signal of a switch unit disposed at the driver seat and described below or when a shock of predetermined intensity or more is sensed in the vehicle or the vehicle is suddenly braked, and when it protrudes and is fixed and attached as an independent device outside the vehicle, it can be folded by operating the switch unit connected to the driver seat by a wire.

Meanwhile, the first pole rod 110 is fixed and coupled to the base 200, and for example, a common half-moon-shaped raising control protrusion and groove serving to seat and fix and spring the uppermost pole rod are formed at the lower end of the first pole rod, and the half-moon-shaped raising control protrusion that controls raising by being fitted in the lower end groove of the upper end pole rod and a groove may be formed at the upper end of the first pole rod.

Further, an accommodation space in which the operation unit of each driving elements are all folded and stored is formed, for example, in a cylindrical shape of a rectangular shape in the base.

Meanwhile, the emergency notification device for a vehicle of the present invention can be attached to the top surface or a side of a vehicle in use. The side angle adjuster 220 and the bottom plate 223 of the base 200 are made of a strong magnetic member, so the base 200 can be attached to the top surface or a side of a vehicle in use.

The emergency notification device for a vehicle according to the present invention may be systemized in a vehicle, and integrally mounted in the vehicle or fixed and attached as an independent device to perform the function by instantaneously spring up and automatically unfold, or may be made as a mobile device and provided at a side of a driver seat to be automatically unfolded by opening a window and pressing the operation button in a sitting state in the vehicle when an emergency occurs, and can quickly notify another driver or a pedestrian by attaching the base having a magnet to the top surface or a side of the vehicle.

Figure 7:
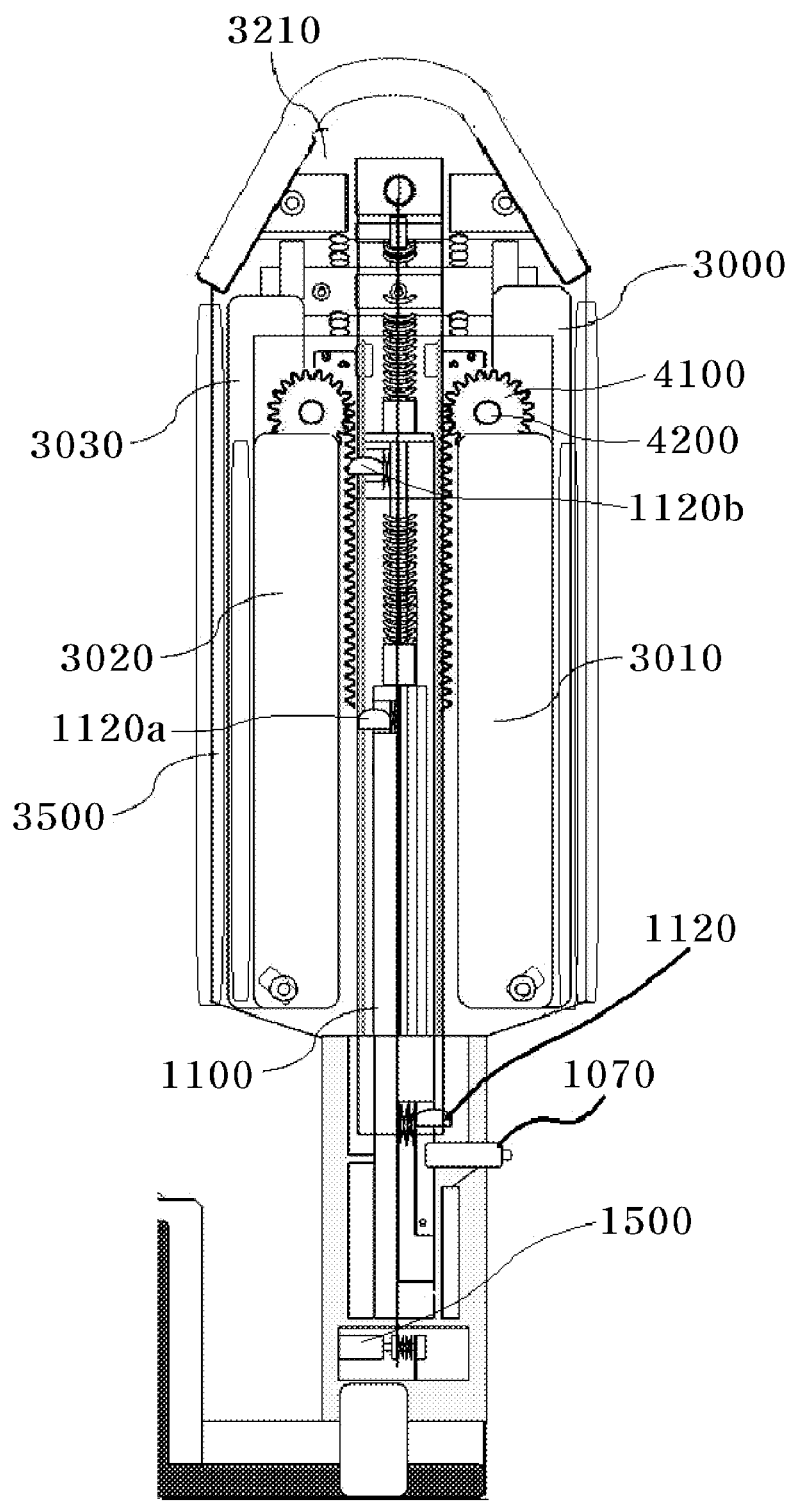
FIG. 7 is a perspective view showing a state in which the emergency notification device for a vehicle according to another embodiment of the present invention is folded.
Figure 8:
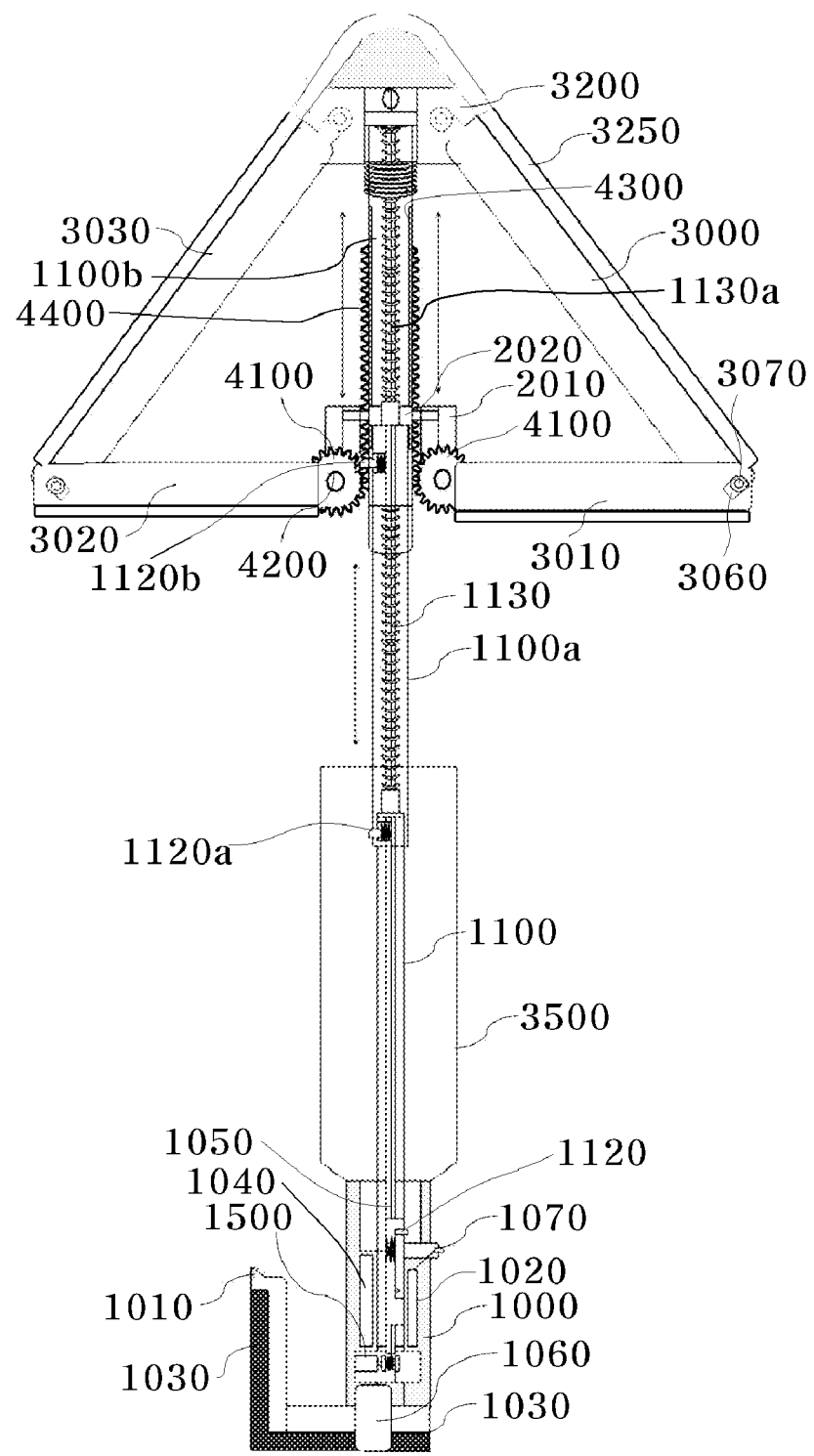
FIG. 8 is a front view showing an unfolded state of the emergency notification device for a vehicle of FIG. 7.

FIGS. 7 and 8 are views showing the emergency notification device for a vehicle of a rear vehicle assistance system according to another embodiment of the present invention. FIG. 7 is a cross-sectional view showing a folded state, that is, a standby mode and FIG. 8 is a cross-sectional view showing an unfolded mode, that is, an operation mode. The emergency notification device for a vehicle for preventing a secondary accident includes a base 1000, a first pole rod 1100 formed in a pipe shape coupled to the base 1000, second and third pole rods 1100a, b formed to have a gradually increasing diameter to be able to insert the first pole rod 1100 therein, a first holder 3200 coupled to the upper end of the third pole rod 1100b, a second holder 2010 coupled to be able to move in the longitudinal direction of the third pole rod 1100b, and light emitting frame units 3000, 3010, 3020, and 3030 connected to the first holder 3200 or the second holder 2010 to be folded.

The first pole rod 1100 has a lower portion coupled to the base 1000, the first pole rod 1100 is inserted in the lower end of the second pole rod 1100a, and a first elastic member 1130 is disposed in the second pole rod 1100a with the first pole rod 1100 therebetween. The second pole rod 1100a is inserted in the third pole rod 1100b and a second elastic member 1130a is disposed in the third pole rod 1100b with the second pole rod 1100a therebetween. A material having elasticity such as a spring is used for the first and second elastic members 1130 and 1130a.

It is preferable that the lower end of the first pole rod 1100 is inserted in a cylindrical main body of the base 1000. A raising control protrusion 1120 is disposed at the lower portion of the first pole rod 1100 inserted in the base 1000, and when an operation button 1070 installed through the side of the base 1000 with a spring therebetween is operated, the raising control protrusion 1120 is pushed, whereby the raising control protrusion 1120 can be unlocked. That is, the raising control protrusion 1120 is inserted in a raising control groove formed on a side of the lower end of the second pole rod 1100a, thereby suppressing raising of the second pole rod 1100a. When the operation button 1070 is pressed and the raising control protrusion 1120 is unlocked, the second pole rod 1100a is raised by repulsion of the first elastic member 1130. When folded for accommodation, the raising control protrusion 1120 is inserted into the raising control groove by pressing down the second pole rod 1100a, thereby suppressing raising of the second pole rod 1100a. A second raising control protrusion 1120a is disposed at the upper portion of the first pole rod 1100, is inserted by operation of the operation button 1070 and is then protruded by a spring when it is not operated. The protruded second raising control protrusion 1120a can be inserted in the raising control groove at the lower portion of the second pole rod when the second pole rod 1100a is raised, and can be inserted in a raising control groove formed at the lower portion of the third pole rod 1100b when the third pole rod 1100b is moved down. Further, a third raising control protrusion 1120b is disposed at the upper portion of the second pole rod 1100a, is inserted by operation of the operation button 1070 and is then protruded by a spring when it is not operated. The protruded third raising control protrusion 1120b is inserted in the raising control groove of the lower portion of the third pole rod when the third pole rod 1100b is raised, and can support pole rods and the second and third pole rods 1100, 1100a, and 1100b in an unfolded state before the third pole rod 1100b is pressed. Meanwhile, the second holder 2010 is fixed to the upper end of the second pole rod 1100a and is fixed and coupled to the upper end of the second pole rod 1100a with the third pole rod 1100b therebetween, so when the second pole rod 1100a is moved, the second holder 2010 is moved together. Oblong grooves 4300 are formed at positions facing each other through the outer circumferential surface in the longitudinal direction of the third pole rod 1100*b*. The second holder 2010 is connected through the oblong grooves 4300, so it can move along the oblong grooves 4300. That is, as shown in FIG. 3, the cylindrical second holder 2010 surrounding the third pole rod 1100*b* in which the second pole rod 1100*a* is inserted has a connection portion 2020 formed through a pair of oblong grooves 4300 formed to face each other through the outer circumferential surface of the third pole rod 1100*b*, and the connection portion 2020 is fixed to the second pole rod 1100*a*. The connection portion 2020 moves along the oblong grooves 4300, so the second holder 2010 and the second pole rod 1100*a* can move.

The light emitting frame unit is composed of a first light emitting frame 3000 and a second light emitting frame 3030 of which ends are rotatably coupled to a first holder 3200, a third light emitting frame 3010 of which an end is rotatably coupled to the other end of the first light emitting frame 3000 and the other end is rotatably coupled to the second holder 2010, and a fourth light emitting frame 3020 of which an end is rotatably coupled to the other end of the second light emitting frame 3030 and the other end is rotatably coupled to the second holder 2010. The first to fourth light emitting frames 3000, 3010, 3020, and 3030 are configured as band-shaped panels having a predetermined width, a light emitting member such as an LED is disposed, or a reflecting member, a fluorescent member, a warning sign, etc. are disposed, thereby being able to notify an accident to the rear on a road. A coupling groove 3060 is formed at each of the other ends of the first and second light emitting frames 3000 and 3030, a coupling pin 3070 is formed at each of the ends of the third and fourth light emitting frames 3010 and 3020, and the coupling pins 3070 are inserted in the coupling grooves 3060 to be rotatably connected.

A pinion gear 4100 is coupled to each of the other ends of the third light emitting frame 3010 and the fourth light emitting frame 3020, and the pinion gear 4100 is coupled to be rotatable about a rotary shaft 4200 vertically coupled to the planes of the third and fourth light emitting frames 3010 and 3020. The rotary shaft 4200 is coupled to the second holder 2010. The third pole rod 1100*b* has a rack gear 4400 formed in the longitudinal direction on the outer circumferential surface. The pinion gear 4100 moves along the rack gear 4400. As the pinion gear 4100 moves along the rack gear 4400, the second holder 2010 can move.

When the third raising control protrusion 1120*b* is unlocked and the third pole rod 1100*b* is raised by repulsion of the second elastic member 1130*a*, the rack gear 4400 is raised together and the pinion gear 4100 engaged with the rack gear 4400 moves to the lower portion from the upper portion of the rack gear 4400. The second holder 2010 also moves to the lower portion of the third pole rod 1100*b* together with the pinion gear 4100, so, as shown in FIG. 5, the third and fourth light emitting frames 3010 and 3020 become horizontal at both sides of the second holder 2010 and can be configured to be automatically unfolded in the shape of a triangle reflector together with the first and second light emitting frames 3000 and 3030 connected to the first holder 3200. When folded, the pinion gear 4100 is rotated in the other direction in mesh with the rack gear 4400, so the third pole rod 1100*b* is moved down. When the first holder 3200 is pulled down, the pinion gear 4100 can rotate in the other direction along the rack gear 4400, and when the raising control protrusion is unlocked, the third pole rod 1100*b* is raised by elasticity of the elastic member, so the pinion gear rotates along the rack gear 4400.

Further, a light emitting lamp may be installed on a surface or both surfaces of the base 1000 to emit light and show a sign in connection with the light emitting frames 3000, 3010, 3020, 3030 forming a triangle reflector formed by unfolding of the first to third pole rods 1100, 1100*a*, and 1100*b*, thereby being able to maximize the notification effect, in which the light emitting lamp, for example, may be an LED.

Figure 9:
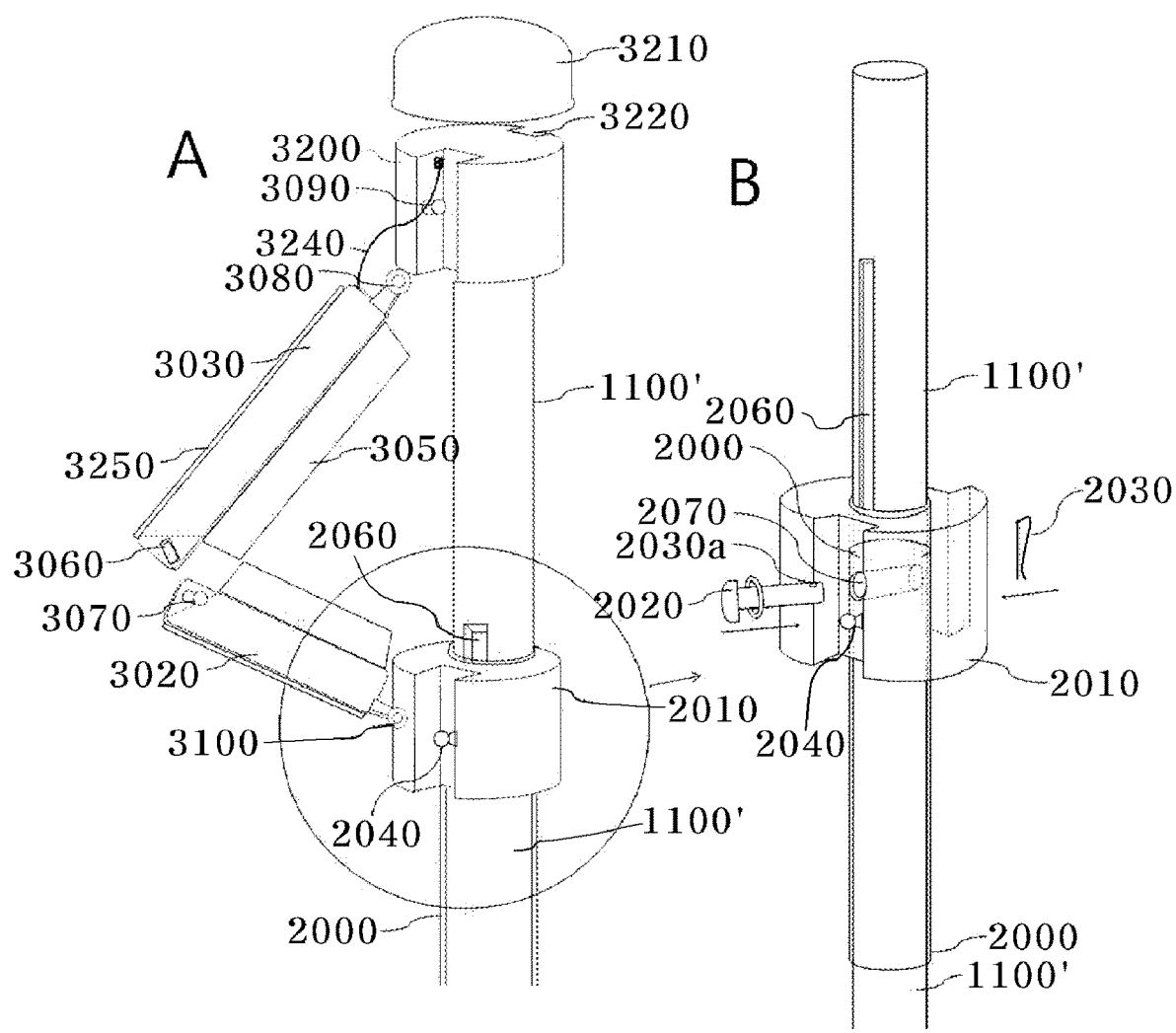
FIG. 9 is a perspective view showing a coupling structure of a light emitting frame and pole rods of the emergency notification device for a vehicle according to another embodiment of the present invention.

Meanwhile, FIG. 9 shows an emergency notification device for a vehicle according to another embodiment of the present invention. The emergency notification device for a vehicle according to the embodiment of FIG. 9, unlike the embodiment composed of the first to third pole rods 1100, 1100*a*, and 1100*b* shown in FIGS. 7 and 8, is composed of one main pole rod 1100' and a guide pole rod 2000 that guides longitudinal movement of the main pole rod 1100'. The main pole rod 1100' is connected with a base at the lower end and with a first holder 3200 at the upper end.

As shown in FIG. 9, the first holder 3200 is formed in a cylindrical shape, a pair of first groove portions 3220 are formed to face each other at 180°, and a coupling pin 3090 having a ball-shaped convex portion is formed on the inner wall of each of the first groove portions. The first light emitting frame 3000 and the second light emitting frame 3030 have a ring-shaped coupling portion 3080 at the upper ends, so when the ring-shaped coupling portions 3080 are fitted and coupled to the coupling pins 3090, the first light emitting frame 3000 and the second light emitting frame 3030 are coupled to be rotatably about the coupling pins 3090. Ends of the third light emitting frame 3020 and the fourth light emitting frame 3040 are rotatably coupled to the lower ends of the first light emitting frame 3000 and the second light emitting frame 3030, respectively. That is, as shown in the figure, coupling grooves 3060 are formed at the lower ends of the first light emitting frame 3000 and the second light emitting frame 3030, and coupling pins 3070 are formed at ends of the third light emitting frame 3020 and the fourth light emitting frame 3040, so when the coupling pins 3070 are fitted and coupled in the coupling grooves 3060, the third light emitting frame 3010 and the fourth light emitting frame 3020 can be rotated about the coupling pins 3070. The other ends of the third light emitting frame 3010 and the fourth light emitting frame 3020 are rotatably coupled to the second holder 2010. The second holder 2010 is fixed to the upper end of the guide pole rod 2000 and moves in the longitudinal direction of the main pole rod 1100' together with the guide pole rod 2000. The second holder 2010 is formed in a cylindrical shape similar to the first holder 3200, a pair of second groove portions are formed to face each other at 180°, and a coupling pin 2040 having a ball-shaped convex portion is formed on the inner wall of each of the second groove portions. The third light emitting frame 3010 and the fourth light emitting frame 3020 have a ring-shaped coupling portion 3100 at the lower ends, so when the ring-shaped coupling portions 3100 are fitted and coupled to the coupling pins 2040, the third light emitting frame 3010 and the fourth light emitting frame 3020 are coupled to be rotatably about the coupling pins 2040. Since the ends of the first, second, third, and fourth light emitting frames 3000, 3030, 3010, and 3020 are coupled to be rotatable about the coupling pins 3090, 3070, and 2040, respectively, when the second holder 2010 is raised, the coupling portions of the lower ends of the first and second light emitting frames 3000 and 3030 and the upper ends of the third and fourth light emitting frames 3010 and 3020 move outward from the main pole rod 1100' and the third and fourth light emitting frames 3010 and 3020 are positioned perpendicular to the main pole rod 1100', as shown in FIG. 9A, whereby the first, second, third, and fourth light emitting frames 3000, 3030, 3010, and 3020 make a triangle.

A light emitting lamp is installed on the main pole rod 1100' having the fixing base 100 configured as a long bar shape and having magnetism at the lower end, the guide pole rod 2000 coupled to the main pole rod 1100' to be movable up/down, the guide holder 2010, and the light emitting frame formed in a structure springing up by an elastic spring disposed in the main pole rod 1100' and connected to the guide holder 2010, and the positions of triangle reflector light emitting frame 3000-3030 lamps and the fixing base 1000 attached to a vehicle, etc. at a considerable height are notified by connecting each other, thereby being able to maximize the notification effect, in which the light emitting lamp may be an LED for example.

The operation unfolding process of the emergency notification device according to the embodiment of FIG. 9 configured as described above is as follows. The emergency notification device for preventing a secondary accident is disposed around a driver seat, and when a sudden situation occurs and the operation button 1070 is pressed as if opening an umbrella, the guide pole rod 2000 and the second holder 2010 controlled by the raising control protrusion 1120 are raised along the oblong grooves 2600 of the main pole rod 1100', and as described above, the light emitting frames 3000, 3010, 3020, and 3030 can be configured to be unfolded in the shape of a triangle reflector.

Meanwhile, it is preferable that a driving circuit 1040 is disposed in the base 1000, a power supply cable 1050 is connected through the first holder 3200 at a side of the light emitting device circuit, and the operation button 1070 is disposed at a side of the base 1000, so the raising control protrusion 1120 is unlocked by operation of the operation button 1070. Here, the light emitting operation button may protrude at the center of the raising operation button 1070 to operate only the light emitting lamp in one step or to simultaneously operate when the operation button 1070 is pressed long. The light emitting lamp operation button may be configured to minimize discharge of a battery by a safety pin. The base 1000 may have a power supply unit on which a battery can be mounted. A mercury battery that is generally widely used is used as the power supply unit, but in accordance with the capacity of the emergency notification device or the capacity of the light emitting device according to the present invention, a lithium or manganese battery may be used, or a type of directly supplying power by connecting an adaptor or a charging type may be made. The light emitting frames 3000, 3010, 3020, and 3030 and the warning light 3230 that are supplied with power from a power supply device can be mounted.

The notification device according to an embodiment of the present invention includes a wire 1050 connected to the lower end of the first holder 3200 through the insides of the pole rods 1100, 1100a, and 1100b, wound on a wire winding roll, and wound or unwound on the winding roll by driving of a wire winding roll driving unit 1500. The winding roll driving unit 1500 is indicated by 702 of FIG. 12. The winding roll driving unit 1500 winds and pulls the wire 1050 in accordance with control of a controller 680 to be described below, to prevent interference when the notification device is folded by pulling the first holder 3200, that is, converted into a standby mode, or when the wire is unwound by rotating the winding roll in an unwinding direction and the pole rods 1100, 1100a, and 1100b are raised by elasticity of the elastic member.

Further, the notification device according to an embodiment of the present invention has the operation button driving unit 1020, so it is possible to control the operation of the raising control protrusions 1120, 1120a, and 1120b by controlling the operation of the operation button. That is, in accordance with a control signal of the controller 680, the operation button driving unit 1020 operates and unlocks the raising control protrusions such that the pole rods 1100, 1100a, and 1100b are raised by elasticity of the elastic member. The controller 680 can also control the operation of the warning light and the operation of the LED of the light emitting frame. This will be described below. The controller 680 can be implemented by a vehicle integrated control system.

Figure 11:
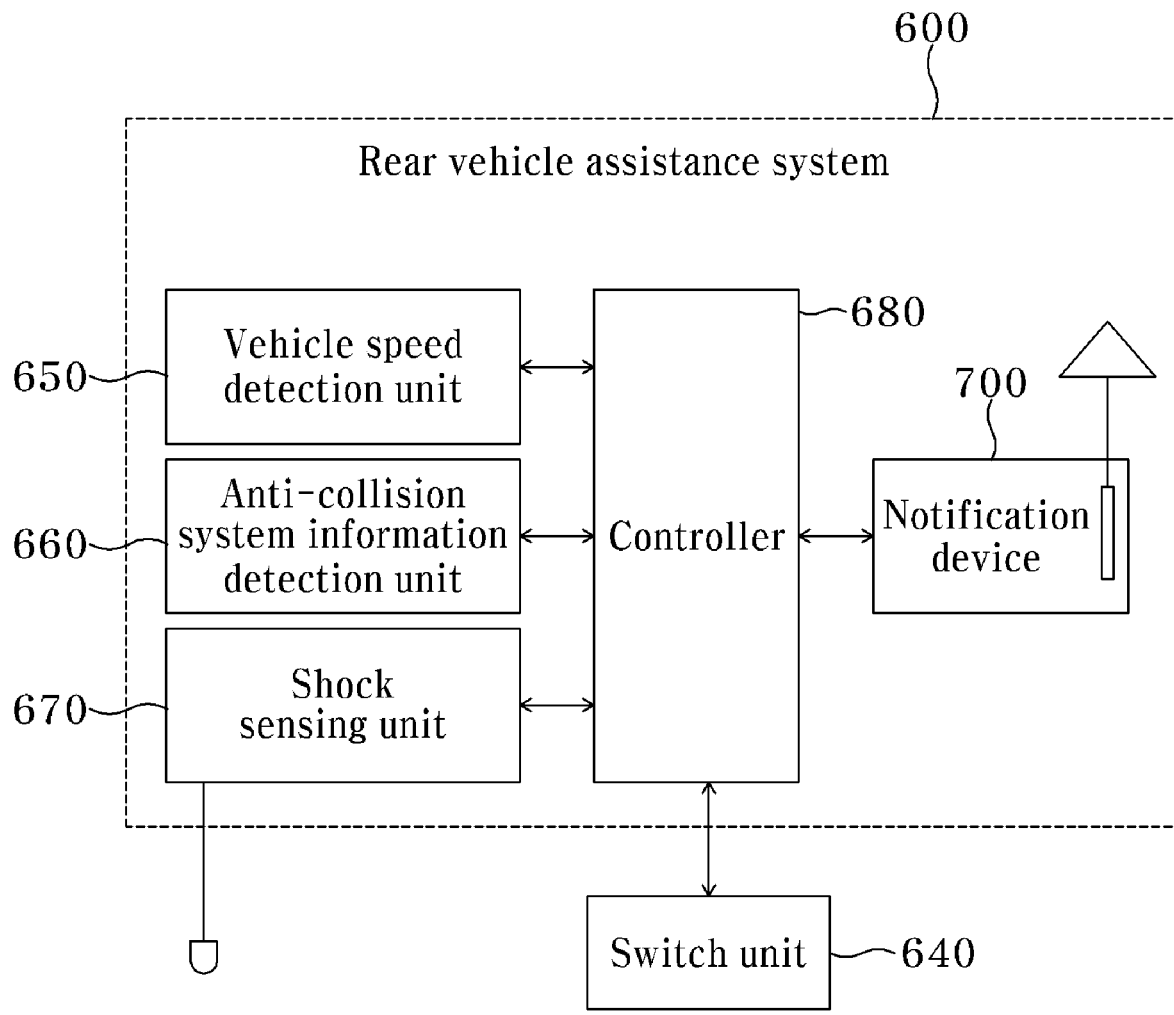
FIG. 11 is a block diagram showing the configuration of the rear vehicle assistance system according to an embodiment of the present invention.
Figure 12:
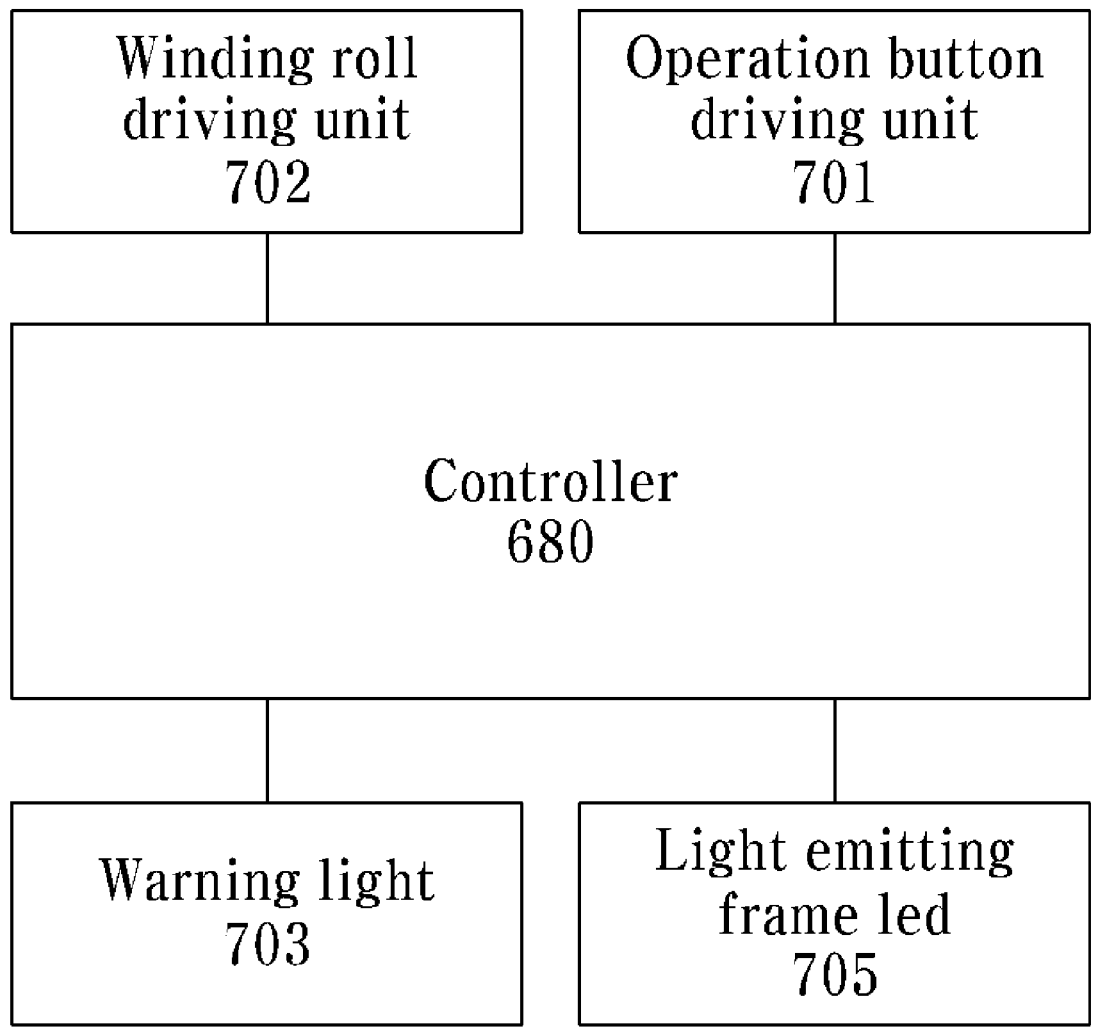
FIG. 12 is a block diagram showing the configuration of a controller of the rear vehicle assistance system according to an embodiment of the present invention.

FIG. 11 is a block diagram schematically showing the configuration of a rear vehicle assistance system according to an embodiment of the present invention and FIG. 12 is a block diagram schematically showing the configuration of a notification device 700 that is controlled by a controller. As shown in FIG. 11, the rear vehicle assistance system according to an embodiment of the present invention includes a vehicle speed detection unit 650, an anti-collision system information detection unit 660, a shock sensing unit 670, a shock sensor 671, a switch unit 640, a controller 680, and the notification device 700 described above. As shown in FIG. 12, the controller 680 is connected with the operation button driving unit 701, the winding roll driving unit 702, the warning light 703, and the light emitting frame LED 705 of the notification device 700, thereby controlling driving of each component in accordance with a mode of the notification device.

The anti-collision system information detection unit 660 acquires operation information data of an anti-collision system and the anti-collision system operates and acquires and transmits information about sudden braking of the vehicle to the controller 680. The anti-collision system information detection unit 660 can acquire anti-collision system operation information on the basis of a notification signal of sudden braking of the vehicle, that is, an alarm or a warning light output signal by operation of the anti-collision system. The vehicle speed detection unit 650 measures and provides driving vehicle speed to the controller 680 on the basis of the number of revolutions of an output shaft of a transmission. The shock sensing unit 670 senses a shock transmitted to the vehicle, and when sensing a shock of predetermined intensity or more, provides relevant information to the controller 680. Further, the shock sensing unit 670 acquires and transmits information about on/off-states of vehicle doors from the vehicle system to the controller 680.

The controller 680 receives information from the vehicle speed detection unit, the anti-collision system information detection unit, the shock sensing unit, and the switch unit and controls the operation of the notification device 700. The controller 680 can control the operation of the notification device 700 on the basis of any one of collected sudden braking information of a vehicle, information about the intensity of a shock applied to the vehicle, information about the operation of the anti-collision system, input instruction information of the switch unit. The controller 680 detects that the vehicle is being driven at a predetermined time or more and a predetermined speed or more with the notification device in an operation mode, and converts the notification device into an operation standby mode, thereby being able to convert the notification device into a folded state.

Hereafter, a notification device operation method is described on the basis of the configuration of the rear vehicle assistance system 600 according to an embodiment of the present invention.

Figure 13:
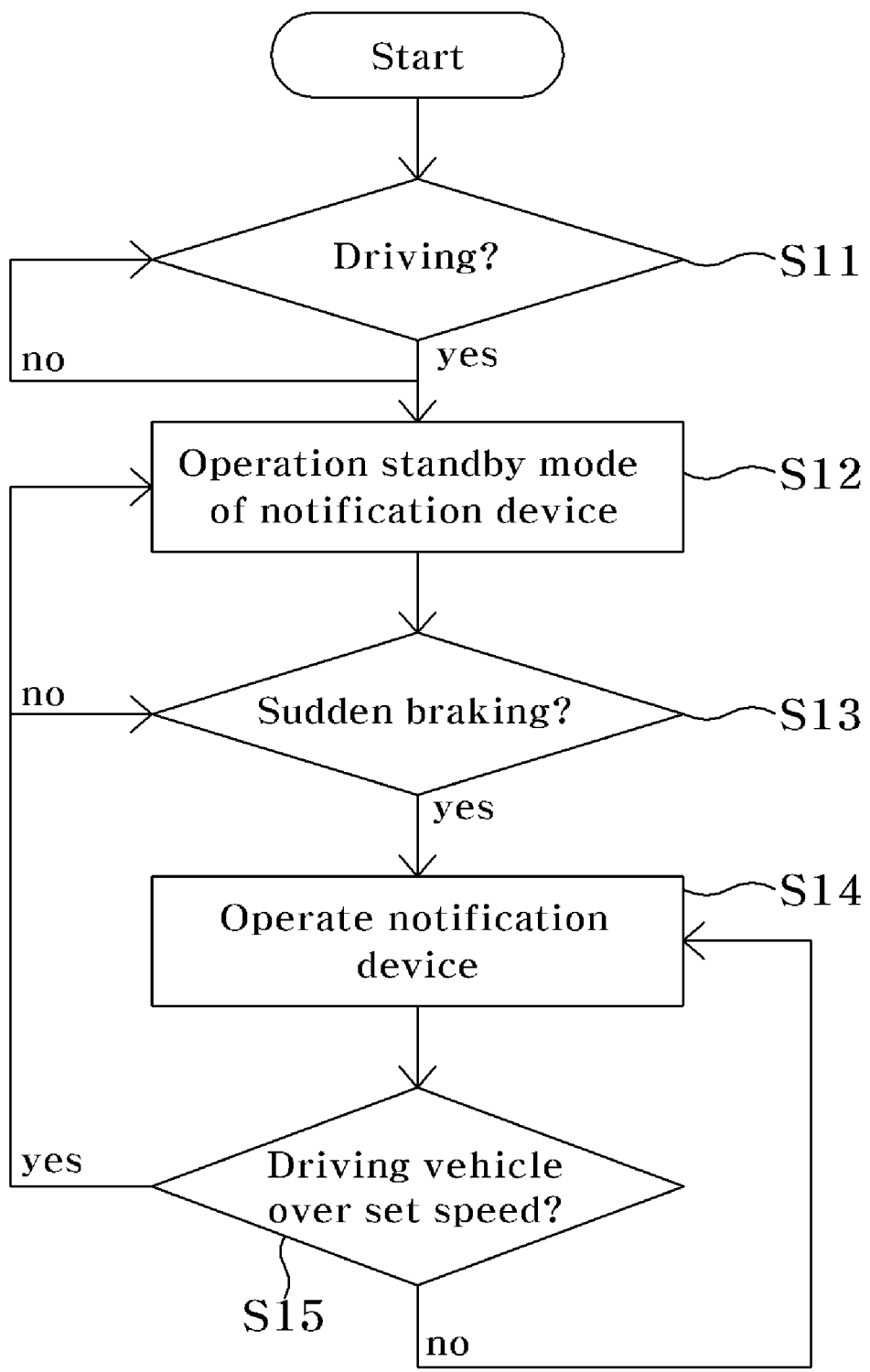
FIG. 13 is a flowchart showing a method of controlling a rear vehicle assistance system according to an embodiment of the present invention.

FIG. 13 is a flowchart showing a method of controlling the operation of the emergency notification device when a vehicle is suddenly braked while being driven. As shown in the figure, the notification device of the rear vehicle assistance system according to an embodiment of the present invention maintains the operation standby mode of the notification device 700 (S12) while driving (S11). When a sudden situation occurs and the vehicle is suddenly braked by suddenly braking (S13), the notification device 700 enters an operation mode (S14). That is, the controller 680 determines whether there is sudden braking in accordance with an input signal of the vehicle speed detection unit 650. The controller 680 determines sudden braking when the vehicle speed detection unit 650 compares the number of revolutions of the transmission and the speed rapidly drops at a predetermined reference value or more. When determining sudden braking, the controller 680 controls the winding roll driving unit 702 to operate in the unwinding state and operates the operation button driving unit 701 such that the operation button is pressed, the raising control protrusion is pressed, the pole rods 1100, 1100*a*, and 1100*b* are raised, and the light emitting frames are unfolded. In this state, when it is determined that the vehicle is driven at a predetermined speed or more in accordance with an input signal of the vehicle speed detection unit 650 (S15), the notification device 700 is operated in a standby mode. That is, the controller 680 controls the winding roll driving unit 702 to wind the wire 1050 by performing a winding operation such that the first holder 3200 is pulled down and the notification device 700 is accommodated in the accommodation unit 800. When the vehicle is driven at a low speed not the predetermined speed or more, the operation state of the notification device is maintained. For example, it may be information that maintains a dangerous situation such as the state in which the vehicle is moved to a safety area such as a shoulder due to a sudden situation.

The controller 680 can control the notification device in the operation mode, as described above, when determining as an emergency situation by operating in combination of the shock sensing unit 670, the operation of the control switch unit 640, and the anti-collision system information detection unit 660.

The controller 680 is connected with the warning light 703 and the light emitting frame LED 705 such that communication is possible, so it can control the warning light 703 and the light emitting frame LED 705 to emit light together or separately in the operation mode of the notification device.

The notification device according to the present invention is characterized in that when a vehicle is driven at a low speed under a predetermined value with the notification device in operation of the notification device, the operation state of the notification device is maintained, and when an emergency button switch is operated with the notification device in be connected with the switch unit, the notification device is converted into the standby mode.

Figure 10:
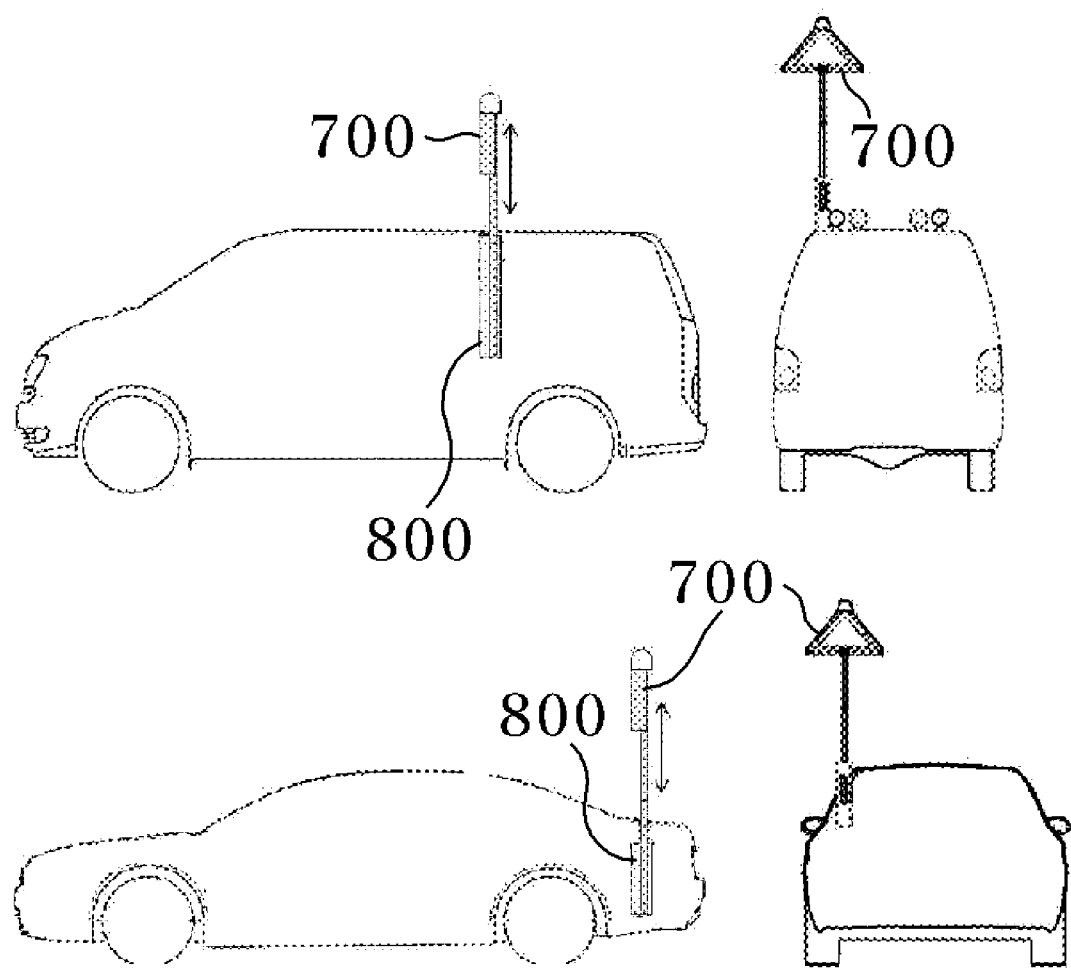
FIG. 10 is a schematic view showing a use state of a rear vehicle assistance system according to an embodiment of the present invention.

FIG. 10 is a schematic view showing a use state of a rear vehicle assistance system according to an embodiment of the present invention. As shown in the figure, it can be configured such that the accommodation unit 800 is disposed in a vehicle, a plurality of pole rods springs up in the way of an umbrella springing up and is quickly unfolded as a triangle reflector at a considerable height to operate light emitting lamps.

A base to which the plurality of pole rods is integrally connected is disposed at the lower end in the accommodation unit 800, for example, an LED lamp that emits light by receiving power from a vehicle system power controller can be mounted, and a light emitting frame unit and a warning light that receive power from the power supply device can be disposed at the upper end.

The notification device according to the present invention configured and operated, as described above, can be formed to be folded into the accommodation unit 800 using the winding roll driving unit 702.

For example, a latchet gear that transmits power only in one direction may be installed in the winding roll driving unit 702, and the wire 1050 fastened to the lower end of the first holder 3200 and raised to the upper end is pulled by forcible power such that the first holder 3200 is moved down and the pole rods and the light emitting frame units are folded and accommodated in the accommodation unit 800.

For example, a notification device of a notification display means described above was described, and it may be configured as a notification device having a notification display means in predetermined various shapes including a triangle reflector. For example, the plurality of pole rods described above is configured such that the diameter increases upward and is folding and contracting after springing up by driving power, and the plurality of pole rods may be configured in the shape of an antenna having a diameter decreasing toward the upper end.

As described above, a notification display means such as a warning light can be mounted at the uppermost ends of the plurality of pole rods, and additionally, various notification methods and notification display means may be configured.

The notification device configured in this way, as shown in FIG. 7, can contribute to protecting human life and making road traffic smooth by preventing a traffic accident due to a secondary collision by operating a light emitting device, which is instantaneously operated to be unfolded like an airbag and functions as a flame signal at a differentiated height when an operation instruction is transmitted from a controller to quickly make following vehicles recognize a situation when a sudden situation occurs.

Although the present invention was described with reference to the accompanying drawings, the present invention may be modified in various ways without departing from the spirit of the present invention. Accordingly, the range of the present invention is not defined to be limited to the embodiments described above and should be defined by the claims and equivalents to the claims.

The invention claimed is:

1. An emergency notification device for a vehicle, the emergency notification device comprising: a base;
   a support pole composed of a plurality of pole rods sequentially connected to the base; and
   a light emitting frame connected to the pole rods and configured unfolded or folded in accordance with moving up or down of the pole rods,
   wherein the plurality of pole rods gradually changes in diameter and is configured sequentially accommodated in a pole rod having a largest diameter or unfolded from the pole rod having the largest diameter, and the plurality of pole rods is coupled with elastic members respectively therebetween when accommodated, and raised by elasticity of the elastic members when the elastic members are not locked, and the light emitting frame includes first and second light emitting frames each having an end rotatably connected to an upper end of a pole rod positioned at an uppermost end of the plurality of pole rods when the plurality of pole rods is unfolded, and third and fourth light emitting frames each having an end rotatably connected to other end of each of the first and second light emitting frames, in which the third and fourth light emitting frames are shorter than the first and second light emitting frames, the third and fourth light emitting frames have the other ends rotatably connected to an upper end of a pole rod connected next to the pole rod positioned at the uppermost end, and when the pole rod positioned at the uppermost end is raised and the first and second light emitting frames are pulled, the ends of the third and fourth light emitting frames are pulled and unfolded.

2. The emergency notification device of claim 1, wherein when the pole rod positioned at the uppermost end is raised, the ends of the third and fourth light emitting frames are pulled, the other ends are rotatably coupled to the pole rod connected next to the pole rod positioned at the uppermost end and perpendicularly connected to the pole rod, and the third and fourth light emitting frames form a triangle together with the first and second light emitting frames.

3. The emergency notification device of claim 1, wherein the support pole includes a pipe-shaped first pole rod, second pole rod, and third pole rod, and the first pole rod has an end fixed to a lower end of the base, the second pole rod has an end connected to the other end of the first pole rod the first pole rod is configured inserted into the second pole rod, a diameter of the second pole rod is larger than that of the first pole rod, the third pole rod has an end connected to the other end of the second pole rod, and the second pole rod is inserted into the third pole rod.

4. The emergency notification device of claim 3, wherein the other end of the third light emitting frame is rotatably coupled to a lower portion of the third pole rod, and a fourth light emitting frame of which the end is rotatably coupled to the other end of the second light emitting frame and the other end is rotatably coupled to the lower portion of the third pole rod.

5. The emergency notification device of claim 4, wherein a cut portion is formed with a predetermined length in a longitudinal direction through a center of the third pole rod, the other ends of the third light emitting frame and the fourth light emitting frame are coupled to face each other by a pin with the cut portion of the third pole rod therebetween, and the pin moves along the cut portion of the third pole rod.

6. The emergency notification device of claim 3, wherein a warning light is disposed in an upper end of the third pole rod.

7. The emergency notification device of claim 3, wherein the base further includes a base main body to which the first pole rod is coupled, and an L-shaped side angle adjuster rotatably coupled to a side of an upper end of the base main body.

8. The emergency notification device of claim 1, wherein the plurality of pole rods is formed in a pipe shape and includes a first pole rod connected to a handle at a lower end, a second pole rod in which the first pole rod is inserted, and the second pole rod is configured drawn out through the lower end, and a third pole rod in which the second pole rod is inserted, and the third pole is configured drawn out through the lower end, and further includes a first holder that is formed in a cylindrical shape, has a pair of first groove portions facing each other at 180°, has coupling pins having a ball-shaped convex portion formed on inner walls of the first groove portions, and is coupled to an upper end of the third pole rod, and coupling grooves are formed at upper ends of the first light emitting frame and the second light emitting frame, and when the coupling grooves are fitted and coupled to the coupling pins, the first light emitting frame and the second light emitting frame are coupled rotatably about the coupling pins, respectively.

9. A rear vehicle assistance system for controlling an emergency notification device for a vehicle, the emergency notification device comprising:

a base;

a plurality of pole rods sequentially connected to the base; and a light emitting frame connected to the pole rods and configured unfolded or folded in accordance with moving up or down of the pole rods, wherein the plurality of pole rods gradually changes in diameter and is configured sequentially accommodated in a pole rod having a largest diameter or unfolded outward from the pole rod having the largest diameter, and the plurality of pole rods is coupled with elastic members respectively therebetween when accommodated, and raised by elasticity of the elastic members when the elastic members are not locked, and the light emitting frame includes a first holder fixed to an upper end of a pole rod positioned at a uppermost end of the plurality of pole rods when the plurality of pole rods is unfolded, first and second light emitting frames each having an end rotatably connected to the first holder, and third and fourth light emitting frames each having an end rotatably connected to the other end of each of the first and second light emitting frames, in which the third and fourth light emitting frames are shorter than the first and second light emitting frames, the third and fourth light emitting frames have the other ends rotatably connected to an upper end of a pole rod connected next to the pole rod positioned at the uppermost end, and when the pole rod positioned at the uppermost end is raised and the first and second light emitting frames are pulled, the ends of the third and fourth light emitting frames are pulled and unfolded, wherein the pole rods are locked by raising control protrusions the raising is suppressed by the elastic members, an operation button for operating an operation of the raising of the control protrusion is disposed in the base, and the rear vehicle assistance system includes: an operation button driver controlling on/off of the operation button; a wire connected to a bottom surface of the first holder and wound on a winding roll disposed on the base through an inner space of the pole rods to move down the first holder, and a winding roll driver operating to wind or unwind the wire; and a controller operating the operation button driver and the winding roll driver, wherein the pole rods are configured raised and the light emitting frame unit is configured unfolded in a shape of a triangle reflector when the vehicle that is being driven is suddenly braked, a shock applied to the vehicle with predetermined intensity or more is sensed, a vehicle anti-collision system is operated, or a driving switch is manually pressed.

10. The rear vehicle assistance system of claim 9, further comprising:

an anti-collision system information detector acquiring a collision alarm and warning light output data from the vehicle anti-collision system;
a vehicle speed detector measuring a vehicle driving speed on the basis of the number of revolutions of an output shaft of a transmission;
a shock sensor sensing a shock; and
an operation switch outputting an operation control signal of the notification device,
wherein the controller is connected with the anti-collision system information detector, the vehicle speed detector, the shock sensor, and the operation switch, and determines whether or not of sudden braking, shock sensing, a sudden situation, and manual control in accordance with an input signal.

11. The rear vehicle assistance system of claim 10, wherein the notification device is converted into an operation standby mode by the controller when the vehicle is driven at a predetermined speed and predetermined time or more in the operation mode of the notification device.

12. The rear vehicle assistance system of claim 9, wherein the emergency notification device for the vehicle is folded and accommodated in the vehicle in a standby mode.

* * * * *